United States Patent
Chen et al.

(10) Patent No.: US 6,960,905 B2
(45) Date of Patent: Nov. 1, 2005

(54) TIME-SHARING CURRENT SENSE CIRCUIT FOR A MULTI-PHASE CONVERTER

(75) Inventors: Jiun-Chiang Chen, Taichung (TW); Hsin-Hsin Ho, Sanchong (TW); Hung-I Wang, Changhua (TW); Liang-Pin Tai, Tainan (TW)

(73) Assignee: Richtek Technology Corp., Hsinchu (TW)

(*) Notice: Subject to any disclaimer, the term of this patent is extended or adjusted under 35 U.S.C. 154(b) by 30 days.

(21) Appl. No.: 10/828,220

(22) Filed: Apr. 21, 2004

(65) Prior Publication Data

US 2005/0140347 A1    Jun. 30, 2005

(30) Foreign Application Priority Data

Dec. 26, 2003 (TW) ............................. 92137089 A (51) Int. Cl.[7] ............................................. G05F 1/563
(52) U.S. Cl. ..................................................... 323/283
(58) Field of Search ............................... 323/268, 282, 323/283, 285, 351

(56) References Cited

U.S. PATENT DOCUMENTS

| | | | |
|---|---|---|---|
| 6,160,388 A * | 12/2000 | Skelton et al. ............... | 323/282 |
| 6,246,220 B1 * | 6/2001 | Isham et al. ................. | 323/224 |
| 6,424,129 B1 * | 7/2002 | Lethellier .................... | 323/272 |
| 6,433,527 B1 * | 8/2002 | Izadinia et al. .............. | 323/300 |
| RE38,487 E * | 4/2004 | Isham et al. ................. | 323/224 |
| 6,747,442 B2 * | 6/2004 | Olsen et al. ................. | 323/283 |
| 6,803,750 B2 * | 10/2004 | Zhang ......................... | 323/222 |
| 6,836,103 B2 * | 12/2004 | Brooks et al. ............... | 323/282 |
| 6,864,644 B2 * | 3/2005 | Kernahan .................... | 315/307 |

\* cited by examiner

*Primary Examiner*—Adolf Berhane
(74) *Attorney, Agent, or Firm*—Rosenberg, Klein & Lee (57) ABSTRACT

In a time-sharing current sense circuit for a multi-phase converter, a common transconductive amplifier is selectively connected to the channels of the converter power stage by a plurality of first switches under the control of a set of control clocks to detect the channel current of a selected channel among the channels so as to generate a sense current, and a sense current generated by the common transconductive amplifier from the sensed channel current is switched by a plurality of second switches under the control of the same control clocks to connect to one of a plurality of sampling-and-holding circuits each corresponding to one of the channels to generate a current sense signal to modulate the channel current of the selected channel.

10 Claims, 7 Drawing Sheets

TIME-SHARING CURRENT SENSE CIRCUIT FOR A MULTI-PHASE CONVERTER

FIELD OF THE INVENTION

The present invention relates generally to a multi-phase converter and more particularly, to a current sense circuit for a multi-phase converter.

BACKGROUND OF THE INVENTION

Figure 1:
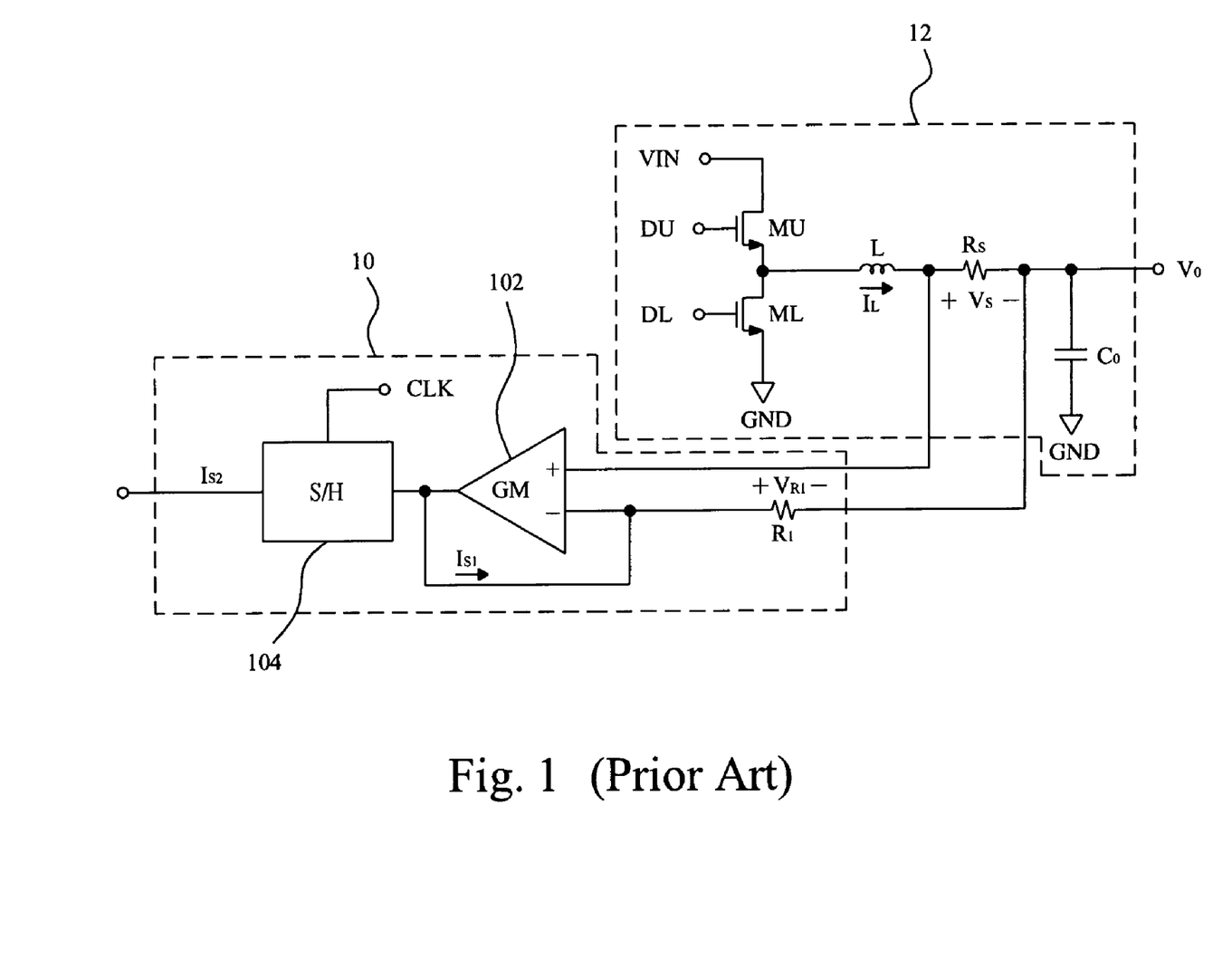
FIG. 1 shows a conventional current sense circuit for a single-phase DC-to-DC converter power stage.

In FIG. 1, it is shown a current sense circuit 10 for a power stage 12 of a single-phase DC-to-DC converter in which a high-side transistor MU and a low-side transistor ML connected between an input voltage VIN and ground GND are switched to thereby generate a channel current $I_L$ flowing through an inductor L and a sense resistor $R_S$. In the current sense circuit 10, the two inputs of a transconductive amplifier 102 are connected to the opposite terminals of the sense resistor $R_S$, respectively, so as to detect the channel current $I_L$ flowing through the sense resistor $R_S$ from which a sense current $I_{S1}$ is generated, and a sampling-and-holding circuit 104 is connected to the output of the transconductive amplifier 102 to generate a current sense signal $I_{S2}$ by sampling-and-holding the sense current $I_{S1}$ under the control of a control clock CLK for the converter 12 to adjust the duty cycles of the drive signals DU and DL for the high-side and low-side transistors MU and ML to modulate the channel current $I_L$. To balance the voltages on the two inputs of the transconductive amplifier 102, a voltage-to-current resistor $R_1$ is inserted between the inverting input of the transconductive amplifier 102 and the sense resistor $R_S$, and the voltage across the voltage-to-current resistor $R_1$ is $$V_{R1}=V_S, \quad \text{EQ-1}$$

where $V_S$ is the voltage across the sense resistor $R_S$. The sense current is $$I_{S1} = \frac{V_{R1}}{R_1}, \quad \text{EQ-2}$$

and by substituting EQ-1 into EQ-2, it is obtained $$I_{S1} = \frac{V_S}{R_1}. \quad \text{EQ-3}$$

On the other hand, the voltage across the sense resistor $R_S$ is $$V_S = I_L \times R_S, \quad \text{EQ-4}$$

and from EQ-3 and EQ-4, it is obtained the sense current $$I_{S1} = I_L \times \frac{R_S}{R_1}, \quad \text{EQ-5}$$

which is proportional to the channel current $I_L$. Therefore, the converter power stage 12 is able to monitor the channel current $I_L$ by use of the current sense signal $I_{S2}$ for the modulation thereof.

Figure 2:
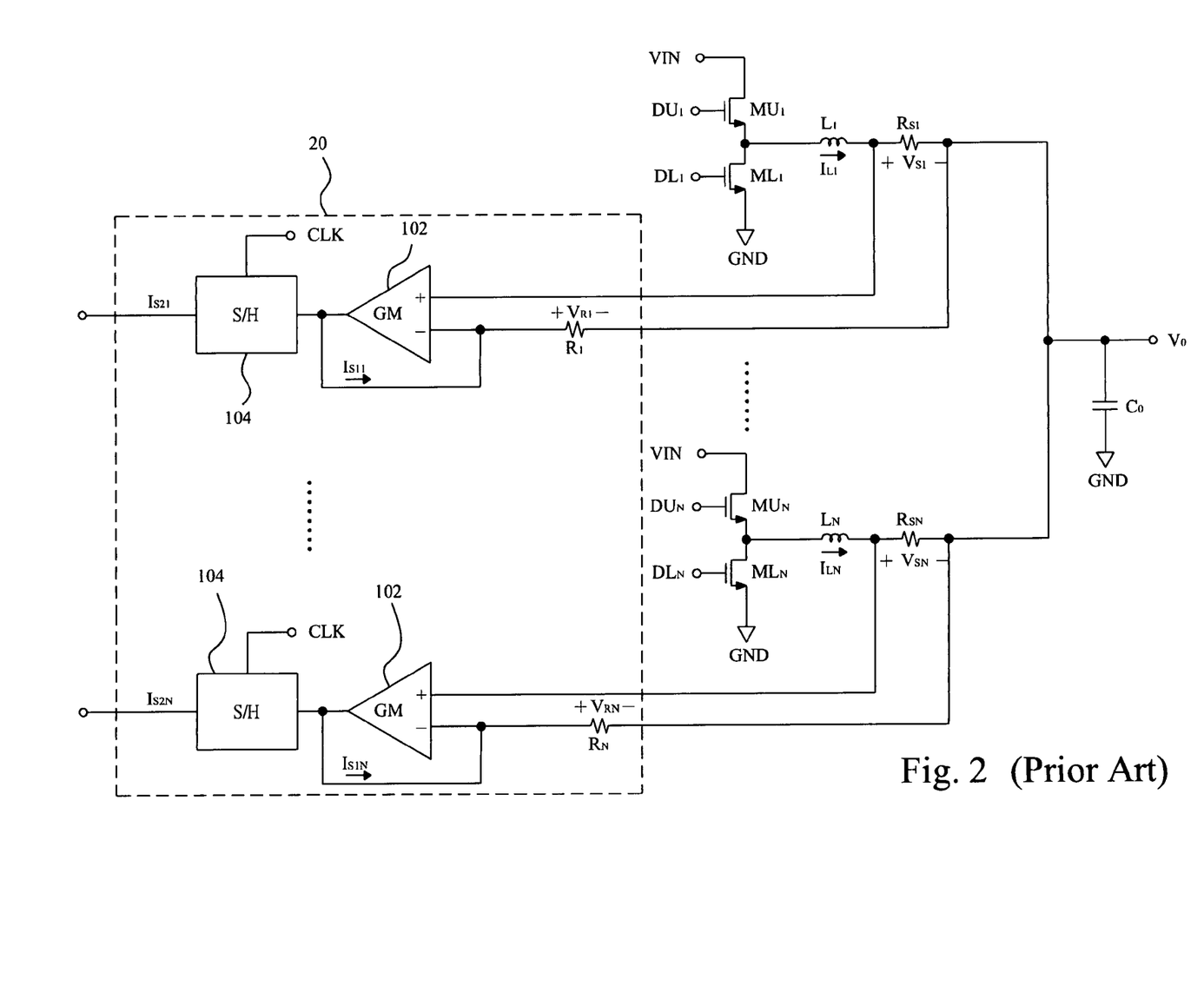
FIG. 2 shows a conventional current sense circuit for a multi-phase DC-to-DC converter power stage.

A multi-phase converter power stage is constructed with a plurality of single-phase converter power stages connected in parallel. FIG. 2 shows a conventional current sense circuit 20 for a multi-phase DC-to-DC converter power stage having a plurality of channels each including a high-side switch $MU_i$ (i=1–N) connected between an input voltage VIN and a phase node, a low-side switch $ML_i$ (i=1–N) connected between the phase node and a system reference, and an inductor $L_i$ (i=1–N) connected between the phase node and a converter output $V_o$. To sense the channel currents $I_{L1}$-$I_{LN}$ of the converter power stage, each channel is provided with a sense resistor $R_{Si}$ (i=1–N) connected between the inductor $L_i$ and the converter output $V_o$, and the two opposite terminals of the sense resistor $R_{Si}$ are connected to the two inputs of a corresponding transconductive amplifier 102, respectively, so as to generate a corresponding sense current $I_{S1i}$ (i=1–N) from the corresponding channel currents $I_{Li}$ for the corresponding sampling-and-holding circuit 104 to further generate the corresponding current sense signals $I_{S2i}$ (i=1–N) to adjust the duty cycles of the drive signals $DU_i$ and $DL_i$ of the corresponding high-side MOS transistor $MU_i$ and the low-side MOS transistor $ML_i$, in order to modulate the channel current $IL_i$ (i=1–N).

Figure 3:
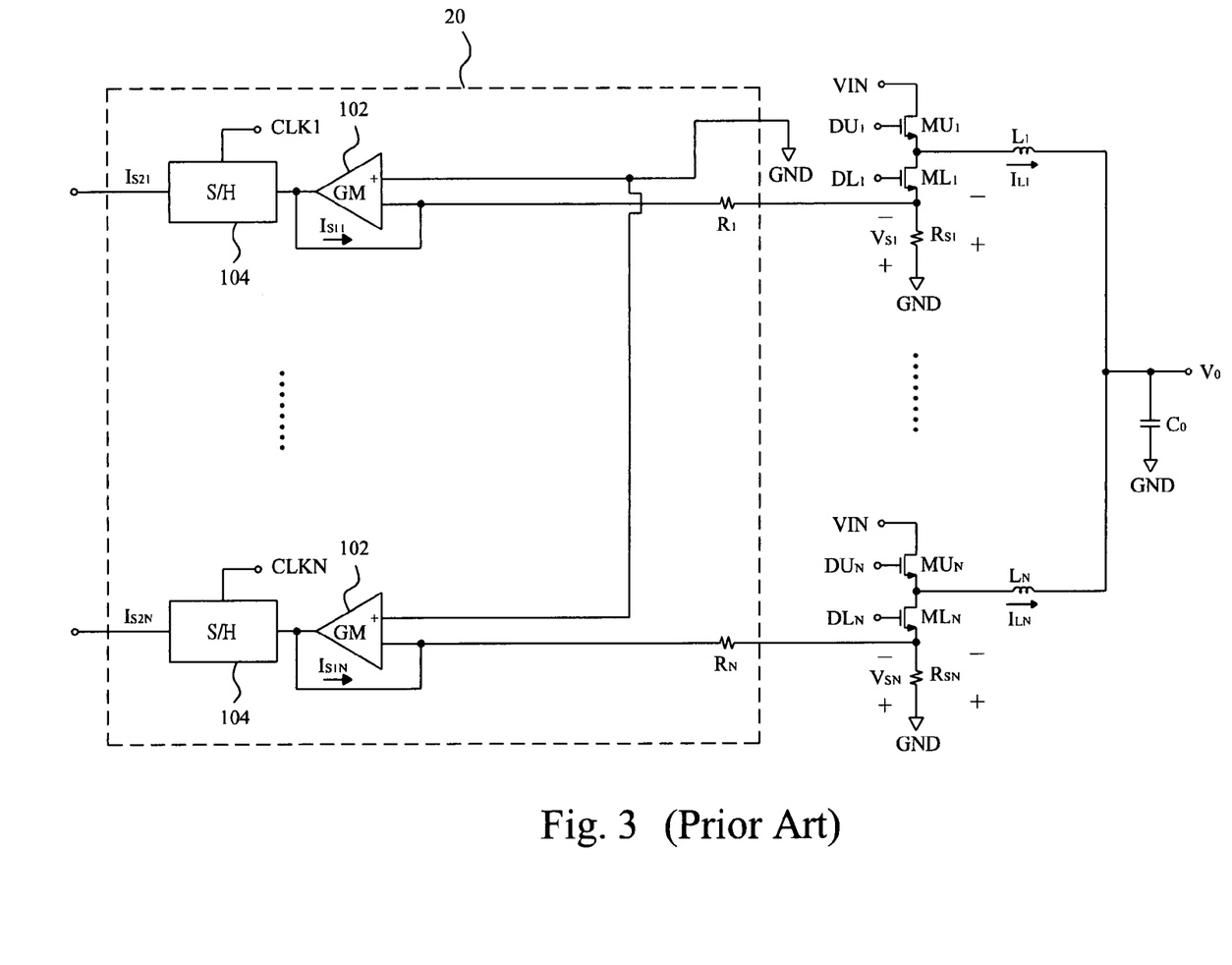
FIG. 3 shows another conventional art using the same current sense circuit of FIG. 2 for a multi-phase DC-to-DC converter power stage.

FIG. 3 shows another conventional art using the same current sense circuit 20 of FIG. 2 for a multi-phase DC-to-DC converter power stage. However, the sense resistors $R_{S1}$-$R_{SN}$ are inserted between the low-side MOS transistors ML and ground GND, respectively, for each channel, instead of between the converter output $V_o$ and the inductors $L_1$-$L_N$. All the non-inverting inputs of the transconductive amplifiers 102 are grounded, and the inverting inputs thereof are connected to the respective sense resistor $R_{Si}$ (i=1–N) through a respective voltage-to-current resistor $R_i$ (i=1–N). Alternatively, the circuit shown in FIG. 3 can be further modified by replacing the sense resistors $R_{S1}$-$R_{SN}$ between the low-side MOS transistors ML and ground GND with the ON-resistances of the low-side MOS transistors ML, in which the operational principle thereof is similar to that of the circuit shown in FIG. 2, only that the ON-resistances of the low-side MOS transistors ML are used to serve as the sense resistors for current sensing for each channel of the converter power stage.

Figure 4:
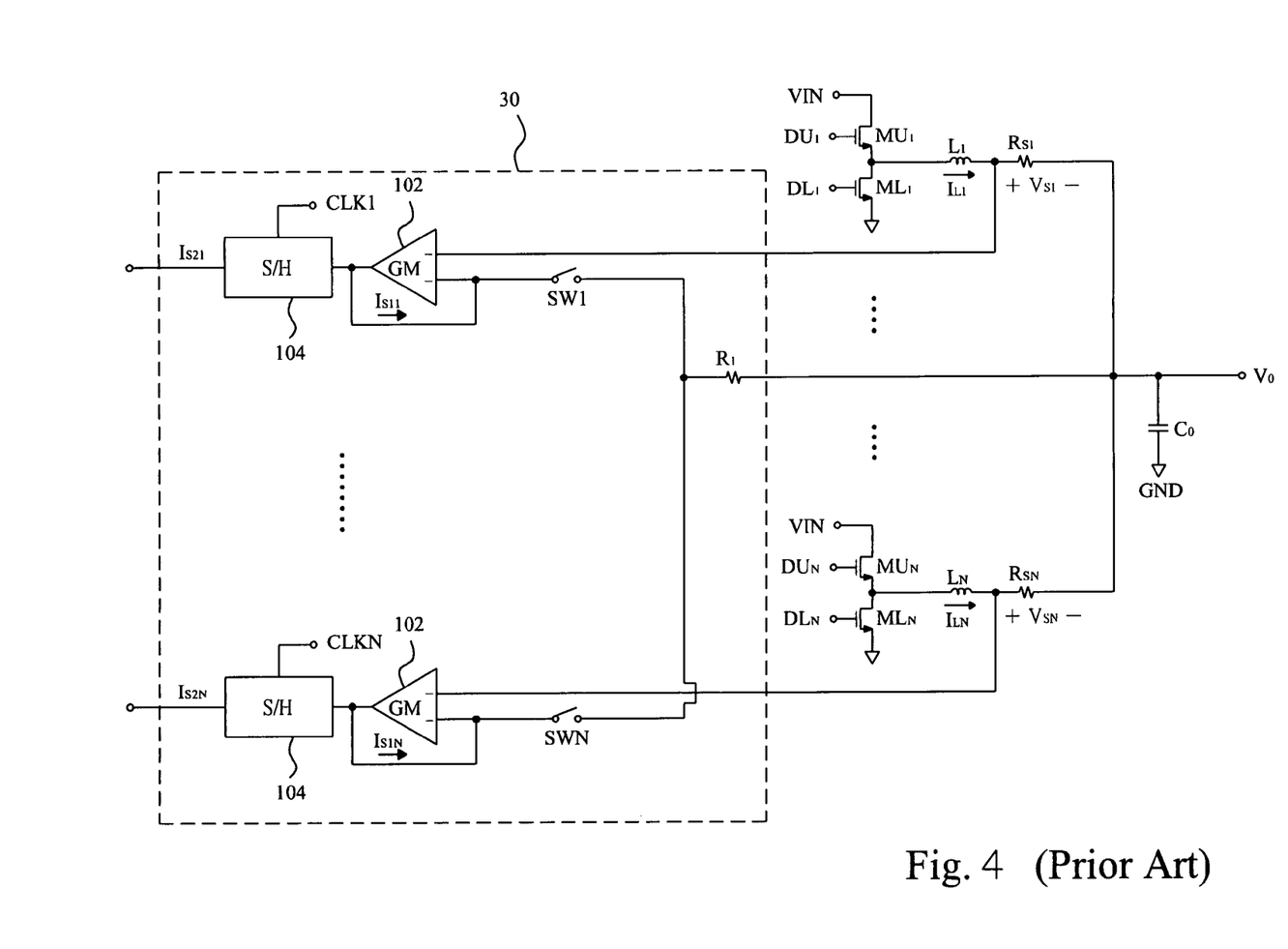
FIG. 4 shows a conventional current sense circuit for a multi-phase DC-to-DC converter power stage, which is able to reduce the number of pins.
Figure 5:
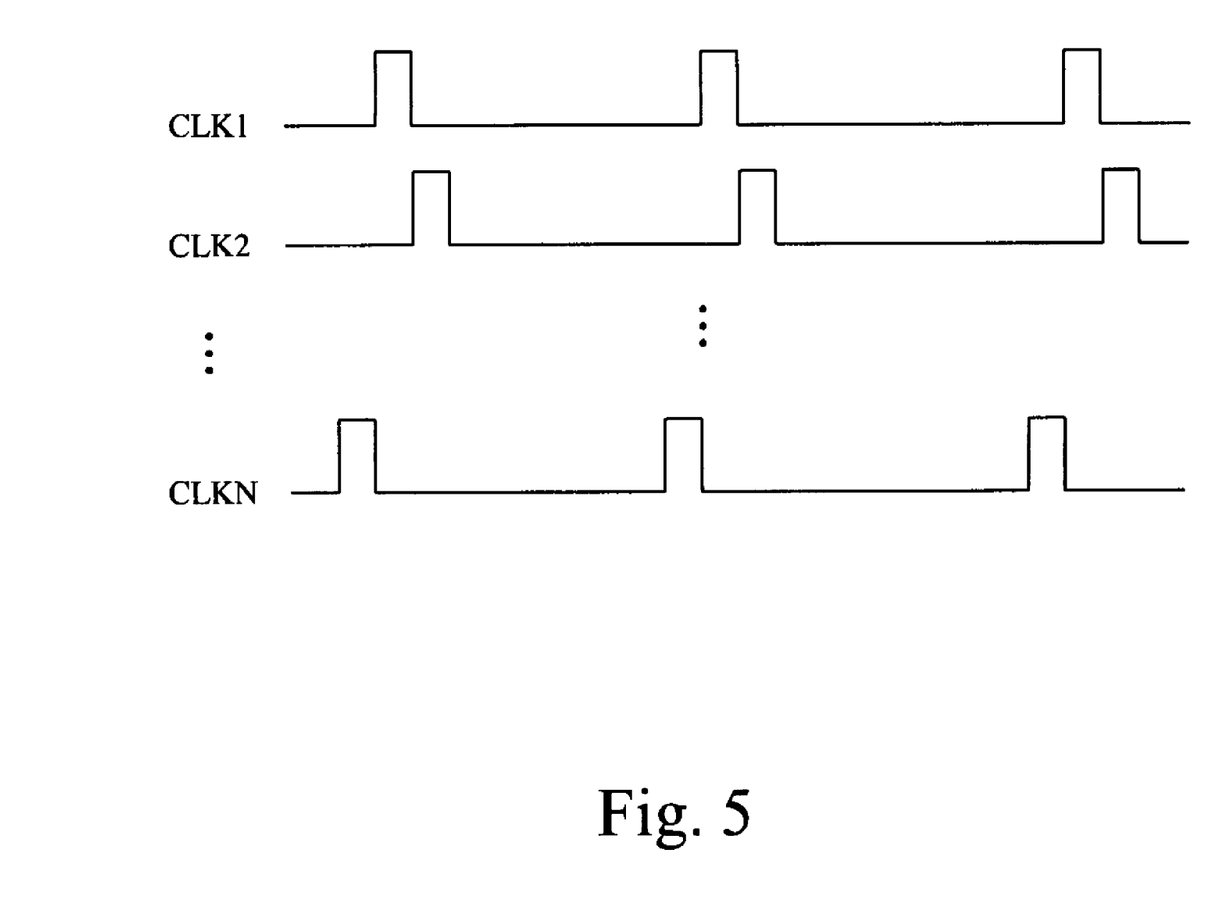
FIG. 5 shows the timing diagram of the control clocks CLK1-CLKN for a time-sharing operation.

When the phases or channels of the converter power stage are increased in number, the pin number and the chip size of the chip containing the current sense circuit 20 both are increased dramatically for multiple transconductive amplifiers 102 are needed. To reduce the pin number of the current sense circuit 20, an improved circuit 30 is proposed as shown in FIG. 4, in which there are still N transconductive amplifiers 102 employed each for one of the channel currents $I_{L1}$-$I_{LN}$. However, a common voltage-to-current resistor $R_1$ is connected between the converter output $V_o$ and N switches $SW_1$-$SW_N$ to switch one of the transconductive amplifiers 102 to connect to the common voltage-to-current resistor $R_1$, and by turning on the switches $SW_1$-$SW_N$ one by one (i.e., each once a time) under the control of control clocks CLK1-CLKN in conjunction with a selected sampling-and-holding circuit 102, the channels are in turn sensed to generate the corresponding current sense signal $I_{S2i}$. As a result, the current sense circuit 30 is able to reduce N-1 pins for the chip containing the current sense circuit 30. For time-sharing operating this circuit 30, the control clocks CLK1-CLKN shown in FIG. 5 are applied to the switches $SW_1$-$SW_N$ and the sampling-and-holding circuits 104. However, due to the large number of the transconductive amplifiers 102, the current sense circuit 30 still requires large chip size.

Moreover, no matter the circuit 20 shown in FIGS. 2 and 3 or the circuit 30 shown in FIG. 4, each channel is provided with a transconductive amplifier 102, it is thus introduced variations of amplifier input offset voltage resulted from variations between different transconductive amplifiers 102 for various channels.

Therefore, it is desired a current sense circuit with reduced pin number and chip size for a multi-phase converter.

SUMMARY OF THE INVENTION

One object of the present invention is to provide a current sense circuit for a multi-phase DC-to-DC converter for the pin number and the chip size thereof both to be reduced.

Another object of the present invention is to provide a time-sharing current sense circuit for a multi-phase DC-to-DC converter to sense the channel currents thereof by common electronic element.

Yet another object of the present invention is to provide a current sense circuit for a multi-phase DC-to-DC converter without amplifier input offset voltage variations for various channels thereof.

In a multi-phase DC-to-DC converter power stage having a plurality of channels each including a high-side switch connected between an input voltage and a phase node, a low-side switch connected between the phase node and a system reference, an inductor connected between the phase node and a converter output, and a sense resistor connected in series with the inductor or the low-side switch, according to the present invention, a time-sharing current sense circuit uses a common transconductive amplifier to generate a sense current from the various channel currents of the converter power stage, wherein the transconductive amplifier has its input selectively connected to one of the channels by a plurality of first switches to sense the respective channel current to generate a sense current for the sensed channel, and the output of the transconductive amplifier is switched between a plurality of sampling-and-holding circuits by a plurality of second switches to connected the sense current to the respective one of the channels to sense the respective sampling-and-holding circuit to generate a current sense signal to modulate the channel current. The transconductive amplifier is commonly used for all the channels of the converter, and the first and second switches are controlled by the same set of control clocks. Due to the common transconductive amplifier used for all channels, the variations of amplifier input offset voltage are avoided. In a first embodiment, one input of the common transconductive amplifier is only connected to the converter output, and in a second embodiment, one input of the common transconductive amplifier is only connected to the system reference, resulting in the reduction of the pin number.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 6:
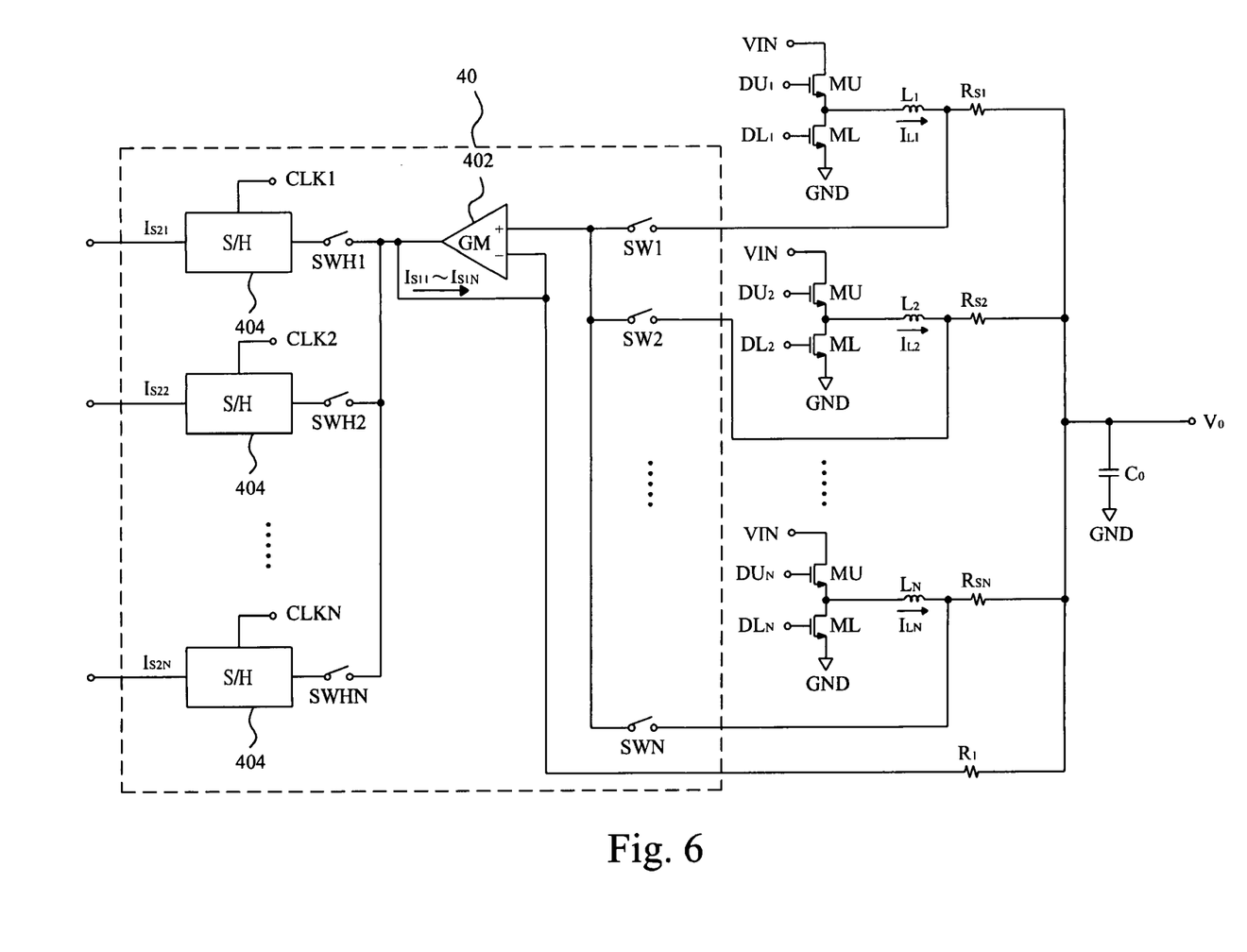
FIG. 6 shows the first embodiment of a current sense circuit for a multi-phase DC-to-DC converter power stage according to the present invention.

FIG. 6 shows a multi-phase DC-to-DC converter power stage that employs the first embodiment of a current sense circuit according to the present invention, in which the multi-phase DC-to-DC converter power stage has a plurality of channels each including a pair of high-side and low-side MOS transistors MU and ML connected between an input voltage VIN and ground GND as the system reference, and those high-side and low-side MOS transistors MU and ML are switched to generate a plurality of channel currents $I_{L1}$-$I_{LN}$ flowing, respectively, through a plurality of inductors $L_1$-$L_N$ each connected to the phase node between the high-side and low-side MOS transistors MU and ML of a respective channel and a plurality of sense resistors $R_{S1}$-$R_{SN}$ each connected between the converter output $V_o$ and a respective one of the inductors $L_1$-$L_N$. The current sense circuit 40 employs a common transconductive amplifier 402 to generate a plurality of sense currents $I_{S11}$-$I_{S1N}$ each derived from a respective one of the channel currents $I_{L1}$-$I_{LN}$ in the manner that the transconductive amplifier 402 has its non-inverting input selectively connected to one of the sense resistors $R_{S1}$-$R_{SN}$ by switching a plurality of switches $SW_1$-$SW_N$, and its inverting input connected to its output and to the converter output $V_o$ through a common voltage to current resistor $R_1$, by which the channel currents $I_{L1}$-$I_{LN}$ are switched to be sensed one-by-one to the transconductive amplifier 402 and each time only a sensed channel is coupled to the transconductive amplifier 402 through the respective one among the switches $SW_1$-$SW_N$, and the sense currents $I_{S11}$-$I_{SIN}$ generated by the transconductive amplifier 402 on its output, respectively, from the respective sensed one among the channel currents $I_{L1}$-$I_{LN}$ are switched to the respective one of a plurality of sampling-and-holding circuits 404 by switching a plurality of switches $SW_{H1}$-$SW_{HN}$ each inserted between the output of the transconductive amplifier 402 and one of the sampling-and-holding circuits 404, so as to generate a plurality of current sense signal $I_{S21}$-$I_{S2N}$ each from the respective one of the sampling-and-holding circuits 404, in order to modulate the corresponding one of the channel currents $I_{L1}$-$I_{LN}$, i.e., the sensed one among the channels.

Figure 7:
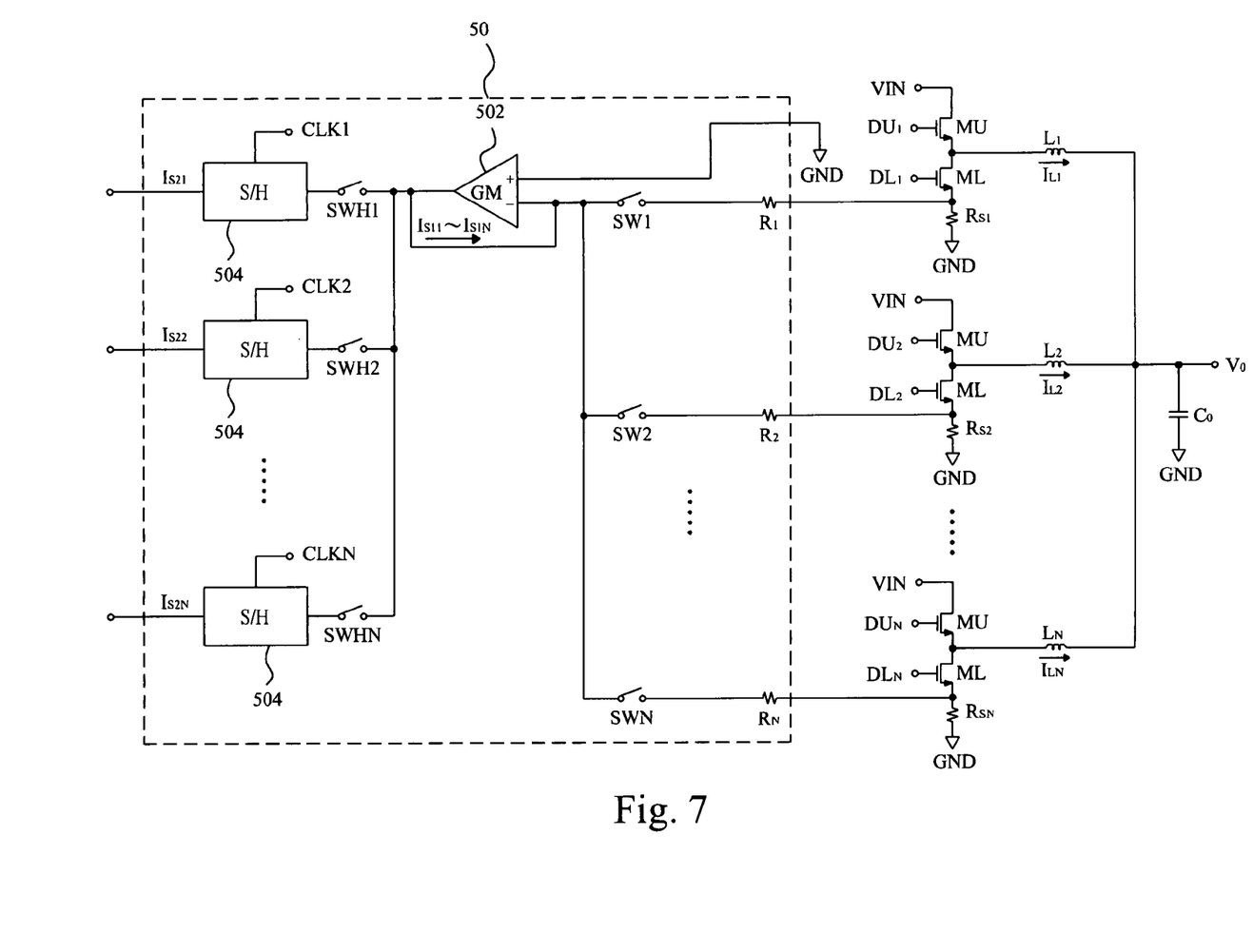
FIG. 7 shows the second embodiment of a current sense circuit for a multi-phase DC-to-DC converter power stage according to the present invention.

FIG. 7 shows another multi-phase DC-to-DC converter power stage that employs the second embodiment of a current sense circuit according to the present invention, in which, similar to that shown in FIG. 6, the multi-phase DC-to-DC converter power stage has a plurality of channels each including a pair of high-side and low-side MOS transistors MU and ML connected between an input voltage VIN and ground GND as the system reference, and those high-side and low-side MOS transistors MU and ML are switched to generate a plurality of channel currents $I_{L1}$-$I_{LN}$ flowing, respectively, through a plurality of inductors $L_1$-$L_N$ each connected between the phase node of a respective channel and the converter output $V_o$. However, the sense resistors $R_{S1}$-$R_{SN}$ are inserted between the low-side MOS transistors ML and ground GND, respectively, for each channel, instead of between the converter output $V_o$ and the inductors $L_1$-LN. Likewise, the current sense circuit 50 employs a common transconductive amplifier 502 to generate a plurality of sense currents $I_{S11}$-$I_{SIN}$ each derived from a respective one of the channel currents $I_{L1}$-$I_{LN}$ in the manner that the transconductive amplifier 502 has its non-inverting input connected to ground GND, and its inverting input connected to its output and selectively connected to one of the sense resistors $R_{S1}$-$R_{SN}$ through one of a plurality of voltage-to-current resistors $R_1$-$R_N$ by switching a plurality of switches $SW_1$-$SW_N$, by which the channel currents $I_{L1}$-$I_{LN}$ are switched to be detected one-by-one to the transconductive amplifier 502 and each time only a sensed channel is coupled to the transconductive amplifier 502 through the respective one among the voltage-to-current resistors $R_1$-$R_N$ and the respective one among the switches $SW_1$-$SW_N$, and the sense currents $I_{S11}$-$I_{SIN}$ generated by the transconductive amplifier 502 on its output, respectively, from the respective sensed one among the channel currents $I_{L1}$-$I_{LN}$ are switched to the respective one of a plurality of sampling-and-holding circuits 504 by switching a plurality of switches $SW_{H1}$-$SW_{HN}$ each inserted between the output of the transconductive amplifier 502 and one of the sampling-and-holding circuits 504, so as to generate a plurality of current sense signal $I_{S21}$-$I_{S2N}$ each from the respective one of the sampling-and-holding circuits 504, in order to modulate the corresponding one of the channel currents $I_{L1}$-$I_{LN}$, i.e., the sensed one among the channels.

Alternatively, the circuit shown in FIG. 7 can be modified to employ the ON-resistances of the low-side transistors ML as the sense resistors to replace $R_{S1}$-$R_{SN}$ shown in FIG. 7, and in such scheme, the inverting input of the transconductive amplifier 502 will be connected to the phase node between the high-side and low-side transistor MU and ML of the respective channel through the respective one among the switches $SW_1$-$SW_N$ and the respective one among the voltage-to-current resistors $R_1$-$R_N$. Other than that for sensing each of the channel currents, the operational principle of this modified embodiment is the same as that of the circuit shown in FIG. 7, and duplicated description is saved.

For the time-sharing current sense circuits 40 and 50, the control clocks CLK1-CLKN shown in FIG. 5 are also applicable thereto to switch the two sets of switches $SW_1$-$SW_N$ and $SW_{H1}$-$SW_{HN}$, and in the time-sharing operation, the channels of the converter power stage are in turn sensed one by one by turning on one switch among $SW_1$-$SW_N$ and one switch among $SW_{H1}$-$SW_{HN}$ corresponding to the sensed channel. For example, if the i-th channel of the converter power stage shown in FIG. 6 is to be sensed, the i-th switches $SW_i$ and $SW_{Hi}$ are turned on by the i-th control clock CLKi, such that the i-th channel is coupled to the transconductive amplifier 402 by the i-th switch $SW_i$ and the i-th sense current $I_{sli}$ derived from the i-th channel current $I_{Li}$ is coupled to the i-th sampling-and-holding circuit 404 by the i-th switch $SW_{Hi}$ to generate the i-th sense current signal $I_{S2i}$ to modulate the i-th channel current $I_{Li}$. During the time-sharing operation, each time only a channel is sensed and only a pair of switches $SW_i$ and $SW_{Hi}$ are turned on for the input and output of the transconductive amplifier 402 are coupled to the sensed channel.

From the illustrated circuits 40 and 50, it is obvious that the structure and scale of the circuits are simplified and reduced, and the more the channels there are in a multi-phase converter power stage, the more it is advantageous. For a converter power stage having N channels, there will be N-1 transconductive amplifiers saved and as a result, there will be N-1 pins saved, since only one common transconductive amplifier is needed and one input of the transconductive amplifier is commonly used to connect to the converter output or ground GND for the time-sharing current sense circuit according to the present invention. It is therefore to substantially reduce the number of the pins and the chip size of the chip containing the time-sharing current sense circuit. Furthermore, due to the same common transconductive amplifier used to generate the sense current from the corresponding channel current for all channels of the converter power stage, the current sense circuit is able to free from amplifier input offset voltage variations that are traditionally resulted from variations between different amplifiers for various channels in the current sense circuit.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A time-sharing current sense circuit for a multi-phase converter having a plurality of channels each including a high-side switch connected between an input voltage and a phase node, a low-side switch connected between said phase node and a system reference, and an inductor connected between said phase node and a converter output for a channel current flowing therethrough, said time-sharing current sense circuit comprising:

a common transconductive amplifier for generating a sense current representative of said channel current for each of said plurality of channels;

a plurality of first switches each between said common transconductive amplifier and one of said plurality of channels for switching between said channel currents to said common transconductive amplifier;

a plurality of sampling-and-holding circuits each for generating a current sense signal responsive to said sense current to modulate respective one of said channel currents; and a plurality of second switches for switching said sense current to one of said plurality of sampling-and-holding circuits.

2. A time-sharing current sense circuit of claim 1, further comprising a plurality of sense resistors each connected between one of said inductors and said converter output for sensing said respective one of said channel currents.

3. A time-sharing current sense circuit of claim 2, wherein said common transconductive amplifier has an inverting input connected to said converter output, and a non-inverting input selectively connected to one of said plurality of sense resistors by said plurality of first switches.

4. A time-sharing current sense circuit of claim 3, further comprising a voltage-to-current resistor connected between said inverting input and said converter output.

5. A time-sharing current sense circuit of claim 1, further comprising a plurality of sense resistors each connected between one of said low-side switches and said system reference for sensing said respective one of said channel currents.

6. A time-sharing current sense circuit of claim 5, wherein said common transconductive amplifier has an inverting input selectively connected to one of said plurality of sense resistors by said plurality of first switches, and a non-inverting input connected to said system reference.

7. A time-sharing current sense circuit of claim 6, further comprising a plurality of voltage-to-current resistors each connected between said inverting input and one of said plurality of sense resistors.

8. A time-sharing current sense circuit of claim 1, wherein each of said low-side switches has an ON-resistance serving as a sense resistor for sensing said channel current thereof.

9. A time-sharing current sense circuit of claim 8, wherein said common transconductive amplifier has an inverting input selectively connected to one of said phase nodes by said plurality of first switches, and a non-inverting input connected to said system reference.

10. A time-sharing current sense circuit of claim 1, further comprising a set of control clocks for switching said plurality of first and second switches.

* * * * *